MAGNETIC RECORDING AND REPRODUCING APPARATUS

Filed Sept. 29, 1959 3 Sheets-Sheet 1

INVENTOR.
MICHAEL J. NOWLAN
BY Morris A. Rabkin
ATTORNEY

May 29, 1962 M. J. NOWLAN 3,037,093

MAGNETIC RECORDING AND REPRODUCING APPARATUS

Filed Sept. 29, 1959 3 Sheets-Sheet 2

INVENTOR.
MICHAEL J. NOWLAN
BY Morris L. Rabkin
ATTORNEY

INVENTOR.
MICHAEL J. NOWLAN
BY
Morris A. Robins
ATTORNEY

United States Patent Office 3,037,093
Patented May 29, 1962

3,037,093

MAGNETIC RECORDING AND REPRODUCING APPARATUS

Michael J. Nowlan, Audubon, N.J., assignor to Radio Corporation of America, a corporation of Delaware Filed Sept. 29, 1959, Ser. No. 843,251
14 Claims. (Cl. 179—100.2)

The present invention relates to magnetic recording and reproducing apparatus, and more particularly to systems for controlling such apparatus.

The present invention is especially suitable for use in magnetic tape recording and reproducing equipment adapted to receive magnetic tape records having pre-recorded selections thereon. The tape records can be wound on reels or carried within cartridges. Such cartridges and records will be referred to hereinafter as pre-recorded record units.

Magnetic tape records are now commercially available with pre-recorded music, speeches and other selections. Many magnetic recordings are made on home magnetic tape recorders having selections which are of permanent, personal significance. Due to the inherent nature of the magnetic reproduction process, such pre-recorded records may be played back a great many number of times without damage to the records. However, much of the commercially sold magnetic tape equipment includes recording as well as reproducing facilities. When the equipment is conditioned for recording, the selections which might have been pre-recorded on the tape are automatically erased and new selections are recorded. Inadvertent erasure and re-recording on a pre-recorded record is therefore possible with this magnetic recording and reproducing equipment. Such inadvertent erasure or re-recording could possibly result in the loss of a costly pre-recorded tape recording or a recording having important personal significance to the owner thereof.

It is therefore an object of the present invention to provide an improved control system for magnetic recording and reproducing apparatus which precludes inadvertent or accidental erasure or re-recording on magnetic records.

It is another object of the present invention to provide an improved control system for magnetic recording and reproducing apparatus which is automatically operative to prevent inadvertent or accidental erasure or re-recording on magnetic records of the pre-recorded record unit type.

It is a still further object of the present invention to provide an improved control system for magnetic recording and reproducing apparatus whereby any attempt to condition the apparatus for re-recording or erasure operations on pre-recorded magnetic tape records automatically actuates safety devices to prevent such operations.

It is a still further object of the present invention to provide an improved control system for magnetic recording and reproducing apparatus which automatically warns the operator upon any attempt to select a recording or erasure operation when a pre-recorded record unit is disposed in operative position in the apparatus.

It is a still further object of the present invention to provide a simplified switching system for preventing inadvertent or accidental re-recording and/or erasure of magnetic records.

It is a still further object of the present invention to provide, in magnetic recording and reproducing apparatus, an improved power switching system for selecting, alternatively, stand-by or automatic switch-off of such apparatus.

The invention may be incorporated in magnetic recording and reproducing apparatus having a control shiftable from a first position in which the apparatus is conditioned for playback to a second position in which the apparatus is conditioned for recording. The apparatus is provided with means, such as a latch, adapted to retain the control in the recording position when the control is shifted into the recording position. The latch is operatively associated with an actuating member, such as a solenoid, which moves the latch to a position preventing latch engagement with the control and thereby preventing retention of the control in recording position. Switch means are provided on the apparatus for preventing erasing and recording operations when actuated by a pre-recorded record unit. For example, a record unit including a pre-recorded magnetic record may have a different form or shape than a unit including a record which is not of the pre-recorded type. The switch means then responds to the difference in form or shape. Other switch means are associated with the control member for further controlling the condition of the apparatus. A circuit is provided for energization of the solenoid through both switch means so that the solenoid is actuated only when a pre-recorded record unit is operatively associated with the apparatus and when an attempt is made to shift the control to recording position. The solenoid may be energized repetitively by alternating current in which case the latch is vibrated by the solenoid against the control member and provides a warning indication to the operator when he attempts to erase or re-record on a pre-recorded tape record.

The invention itself, both as to its organization and method of operation, as well as the foregoing and other objects and advantages thereof, will become more readily apparent from a reading of the following description in connection with the accompanying drawings in which.

Figure 1:
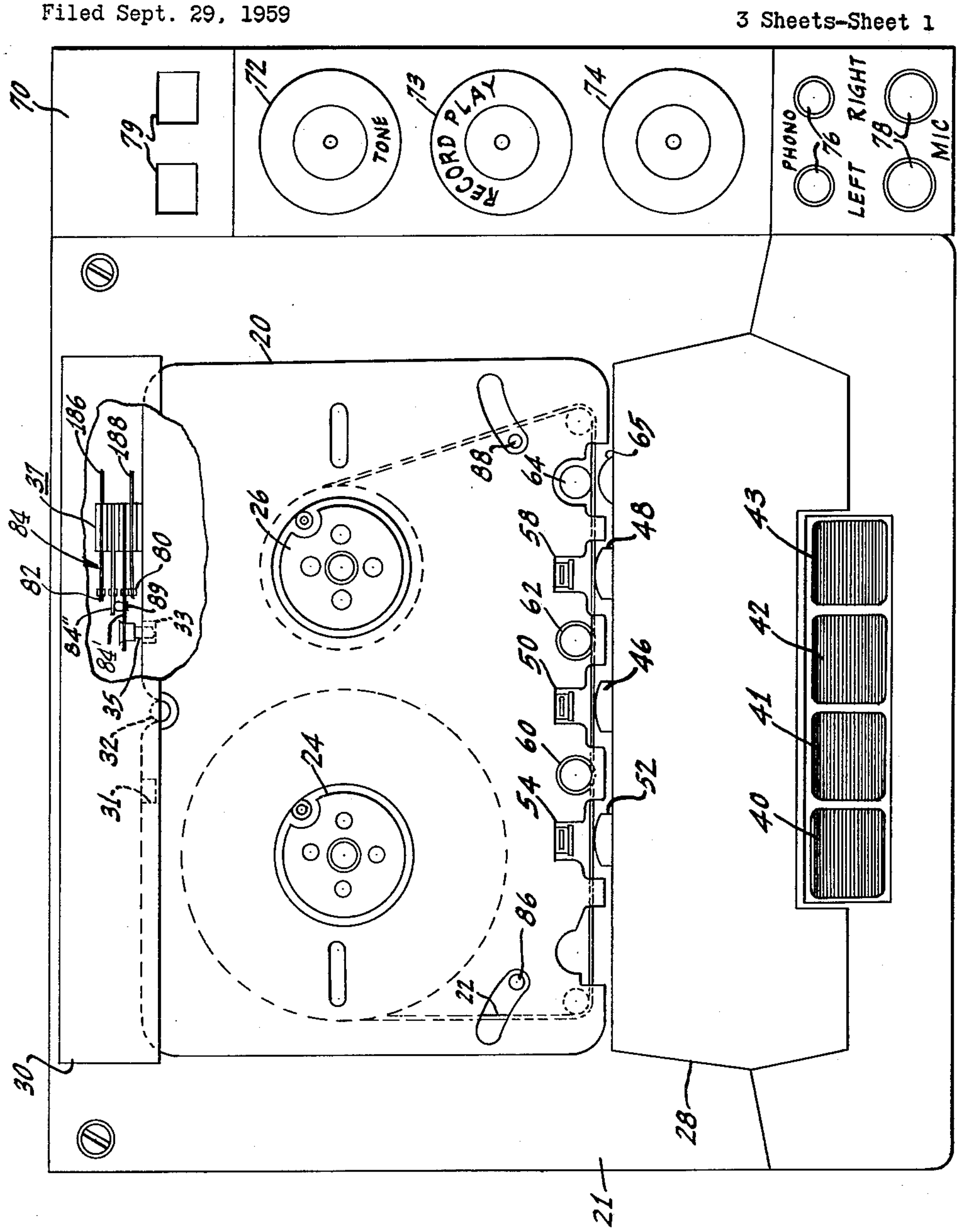
FIG. 1 is a top plan view of a magnetic tape recording and reproducing apparatus, partly broken away to show switch means responsive to special magnetic records in accordance with this invention.

Referring to FIG. 1 of the drawings, there is shown a magnetic recording and reproducing apparatus incorporating a preferred embodiment of the present invention. This magnetic recording and reproducing apparatus is adapted to receive magnetic tape records carried in cartridges. A tape cartridge 20 is shown disposed in operative position on a tape deck 21 of the magnetic recording and reproducing apparatus.

Briefly, the cartridge is of the coplanar type and comprises a two part plastic case. A tape record 22 is wound on two hubs 24 and 26. The tape travels between the hubs along a path through and across various openings which are adapted to receive the scanning and reeling elements of the magnetic recording and reproducing apparatus.

The tape cartridge is adapted to receive tape records which may have pre-recorded selections thereon and thus constitutes a pre-recorded record unit as aforesaid. The rear edge of this cartridge includes two openings or cutouts 31 and 33. The cut-out 31 is adapted to receive a pin 35 which operates a switch 37 to be described in detail hereinafter. A second cut-out 33 is provided so that this second cut-out is available for receiving the switch actuating pin 35 when the cartridge is reversed (that is, turned over) so that the tape can be run from either hub to the other whereby other record tracks may be scanned for recording or reproducing thereon. Other cartridges may be provided without the cut-outs 31 and 33. These cartridges are used to carry blank tape records or tape records having selections recorded thereon of a temporary nature and which may be erased upon subsequent recording of other selections. The tape transport mechanism is illustrated in an instruction book, prepared by Commercial Service, RCA Service Company, Camden 8, New Jersey, and entitled "Cartridge Tape Transport TCT–2 Semi-Automatic Service Data, 1959, No. 4" (first edition, first printing, May 18, 1959).

The illustrated tape transport mechanism includes a decorative escutcheon 28 and a back guide bar 30, both of which are mounted on the deck 21. A stud 32 automatically releases an internal brake in the tape cartridge when the cartridge is placed in operating position on the deck 21, as disclosed more fully in the aforementioned instruction book.

The switch 37 is placed under the guide bar 30 on the deck 21. This switch 37 will be referred to hereinafter as the guide bar switch. The switch 37 includes a pair of front contacts 80 and a pair of back contacts 82. The contacts are each mounted on individual spring arms 84. Different terminals are connected to the spring arms 84. Two of these terminals 186 and 188 are shown in FIG. 1 of the drawings.

The switch actuating pin 35 is mounted on one of the arms 84 which is indicated in the drawings as the arm 84'. This arm 84' is longer than the other arms 84. The arm 84' has a projection 89 of insulating material disposed to contact an adjacent one of the arms 84 which is indicated in the drawing as 84''. When the pin 35 is not actuated by the cartridge 20, which is the case when a cartridge is of the special type having a cut-out 33, the front contacts 80 are closed and the rear contacts 82 are open. When a cartridge without a cut-out 33 is disposed in operating position on the tape deck 21, the arm 84'' is shifted to the rear so that the back contacts 82 are closed while the front contacts 80 are open. The means for utilization of the different switch relationships will be set forth hereinafter particularly in connection with FIG. 6.

Four manual pushbuttons 40, 41, 42 and 43 are provided on the tape transport mechanism. The functions of these buttons are to condition the tape transport mechanism, respectively, for play/record, rewind, fast-forward and stop. A pair of magnetic heads 46 and 48 are mounted in the apparatus. These heads are substantially identical and contain two separate core structures. The head 46 is operated as an erase head and the head 48 is operated either as a recording head or as a reproducing head. The cores on the two heads 46 and 48 are aligned so that erasing and recording may take place simultaneously on two record tracks. It will be pointed out hereinafter how, during reproducing operation when a special pre-recorded record is placed in operative position on the apparatus, the erasing and recording operations are disabled. Two core structures permit simultaneous recording or playback from two tracks and therefore permit stereophonic sound recording and reproduction. A curved block 52 may be used in place of a third head so as to provide a balanced array.

An assembly consisting of three pressure pads 54, 50 and 58 cooperates with the block 52 and the heads 46 and 48. A pair of tape guides 60 and 62 are located on opposite sides of the center pressure pad 50.

A capstan 64 is located to the right of the head and pressure pad assembly for driving the tape at constant speed during recording and playback operations. A pressure roller 65, partly shown in FIG. 1, is adapted to pinch the tape against the capstan 64. Pins 86 and 88 for sensing the tension and position of the tape as it is reeled between the hubs 24 and 26 extend through arcuate openings in the deck 21 and in the cartridge 20. These pins are shown in the position they occupy when the recorder is stopped; that is, after the stop button 43 has been pressed. When either the play/record button 40 or the fast-forward button 42 is pressed, the pin 86 moves to the left so as to ride against the tape. The other pin 88 moves to the right when the button 41 is depressed during rewinding operations. At the end of a run of tape during forward reeling operations, the pin 86 moves toward the right so as to actuate a tension responsive mechanism which automatically stops tape reeling operations. The other pin 88 operates in a similar manner during reverse rewind operations.

An amplifier control panel 70 is disposed to the right of the deck 21 of the tape transport mechanism. This amplifier control panel includes a knob 72 for a combined tone/loudness and on/off control. The on/off switch for the amplifier, which is associated with the tape transport mechanism, may be actuated by pulling up on the center portion of the control. Dual purpose controls of this type, such as the tone/loudness-on/off control are known in the art and will not be described further herein. A second knob 73 for another control for conditioning the apparatus for recording or playback (reproduction) operation is also provided, as is a third knob 74 for a control adapted to select various recording and reproducing functions. The third knob 74 is used for selecting either monaural or stereophonic recording or reproducing. Another position of this third knob 74 enables the use of the loudspeaker system in the apparatus with other stereophonic equipment, such as a stereophonic phonograph. Jacks 76 provide input connections from a phonograph or other apparatus for recording or playback. Microphone jacks 78 are provided to permit connection of either one or two microphones during recording. Recording level indicator lamps are disposed under openings 79 in the panel 70.

The pushbutton controls 40, 41, 43 are operatively associated with an electrical switch 90 (refer now to FIG. 2) for controlling the application of power to a motor 92 which provides driving power for the tape transport mechanism. These pushbutton control members 40, 41, 43 are also operatively associated with the mechanisms for effecting different modes of tape drive, such as slow speed drive for recording and reproducing, and high speed reeling in forward and reverse directions. Each pushbutton 40, 41, 42 and 43 is carried on a different one of four pushbutton shafts 94. The shafts are secured between a chassis member 96 and a bearing bracket 98. The finger acutatable elements of the pushbuttons 40, 41, 42, 43 are fastened each to a different one of four pushbutton brackets 100. Each of the brackets 100 has a flange 102 at the lower end thereof. These end flanges 102 cooperate with a locking slide 104. The locking slide is biased to the left by a spring 106. The slide also has a plurality of teeth extending upwardly therefrom toward the pushbutton brackets 100. The spacing of the teeth and the width of the flanges 102 are so related that the flanges 102 of the pushbuttons 40, 41, 42 may be received only one at a time within different ones of the openings defined by the teeth of the locking slide 104, when the pushbuttons are depressed.

A relatively wide bell crank lever 108 is mounted with its axis of rotation parallel to the front edge of the deck 21. Another bell crank lever 134 is pivotally mounted on the chassis member 96. One end of this other lever 134 is adapted to be contacted by the end flange of the stop pushbutton 43, while the other end of the lever 134 is adapted to contact the under side of the wide bell crank lever 108. The bracket 100 of the stop pushbutton 43 is normally biased upwardly by means of a spring 110 around its shaft 94. The wide bell crank lever 108 is adapted to contact the end flanges 102 of the reeling control pushbuttons 40, 41, 42 when the wide bell crank lever is pivoted rearwardly. Accordingly, when the stop button 43 is pressed, the other bell crank lever 134 pivots and, in turn, pivots the wide bell crank lever 108 so that the lower arm of this latter lever 108 raises the pushbuttons 40, 41, 42. This releases the reeling mechanisms associated with these pushbutton controls 40, 41, 42 and causes the reeling operations to stop.

A tongue 110 extends from the lower arm of the wide bell crank lever 108. This tongue actuates the switch 90 which controls the motor 92. The switch 90 is fastened to the chassis 96 by means of a bracket 112. Another bracket 114 is carried by the switch 90. This bracket 114 is made of spring material and provides a spring switch actuating arm. This spring switch actuating arm cooperates with an actuating member 115 of the switch. The tongue 110 cooperates with this spring actuating member 115. When the wide bell crank lever 108 pivots downwardly and forwardly, the tongue 110 depresses the switch actuating member 115 through the spring arm of the bracket 114. When the switch actuating member 115 is depressed, power is connected to the motor 92 through the switch 90, as will be brought out more fully hereinafter in connection with FIG. 6.

Figure 2:
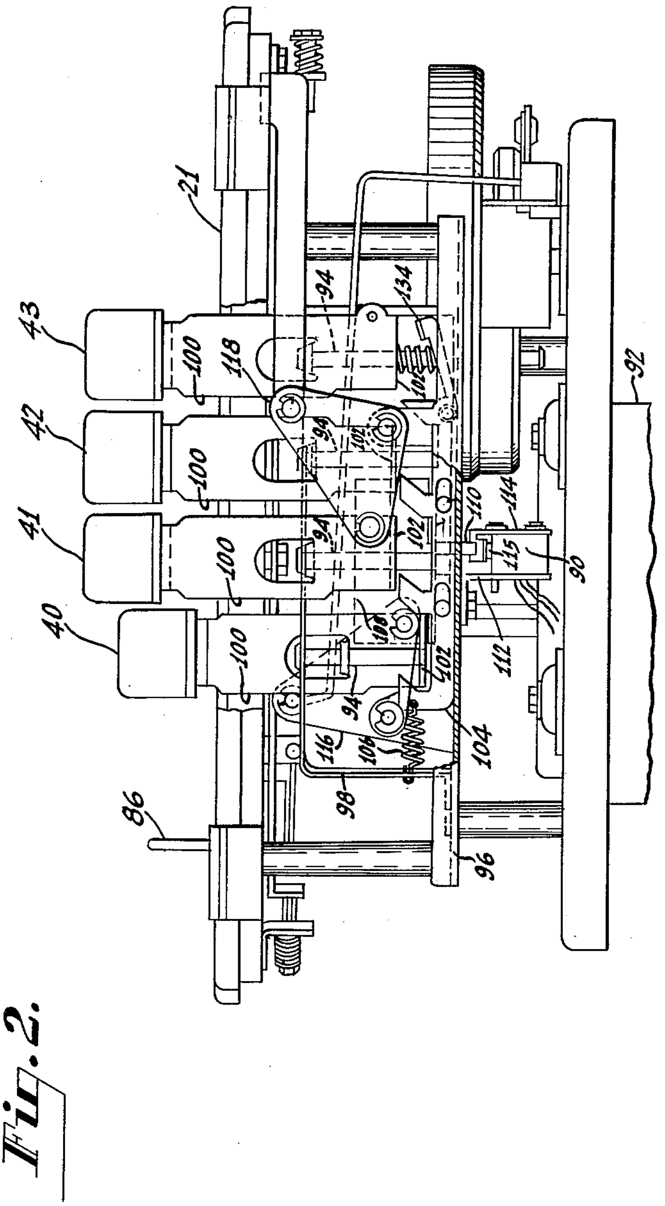
FIG. 2 is a front elevational view of a portion of the apparatus shown in FIG. 1, partly in section to illustrate another switch control associated with the apparatus.

Since one of the reeling control pushbuttons 40, 41, 42, shown toward the left in FIG. 2, is depressed in order to condition the apparatus for reeling operations and since, as will be observed from FIG. 2, depression of any of these three reeling control pushbuttons pivots the wide bell crank 108 so that its tongue 110 causes actuation of the switch 90. The switch 90 is automatically actuated upon selection of any of the reeling operations of the magnetic recording and reproducing apparatus.

The reeling control pushbuttons 40, 41, 42 remain down after being depressed because of the mechanism associated therewith as is explained more fully in the aforementioned instruction book. Triangular shaped bell cranks 116 and 118 and other means not shown in FIG. 2 couple the reeling control pushbuttons 40, 41, 42 to the reeling control mechanisms.

When reeling operations are stopped, as, for example, automatically or by pressing the stop pushbutton 43, the reeling control pushbuttons 40, 41, 42 return upwardly to their original positions, the wide bell crank 108 pivots upwardly, and the switch 90 is deactuated.

Figure 3:
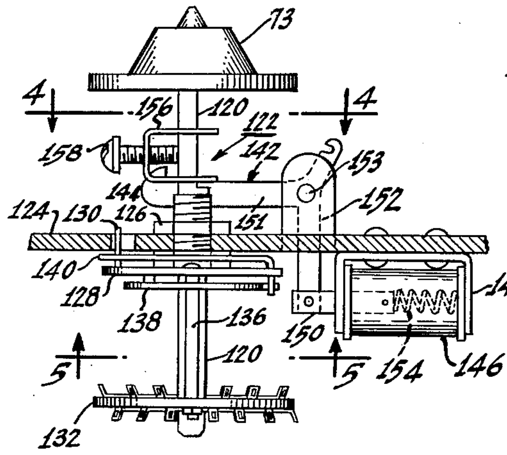
FIG. 3 is an elevational view of still another control mechanism associated with the apparatus shown in FIG. 1.
Figure 4:
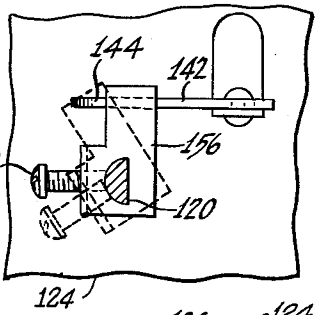
FIG. 4 is a fragmentary sectional view taken along the line 4—4 of FIG. 3.
Figure 5:
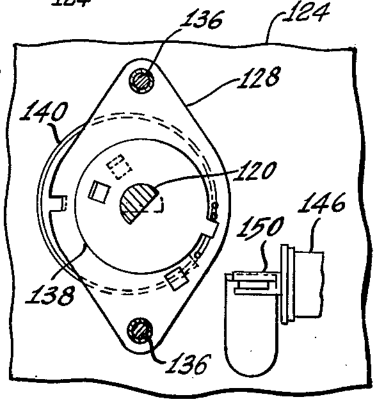
FIG. 5 is a fragmentary sectional view taken along the line 5—5 of FIG. 4.

In order to select recording or reproducing operations, the record/playback control, which is actuated by the knob 73 (FIG. 1), is used. The mechanism associated with this knob and the record/playback control is illustrated in FIGS. 3, 4 and 5 of the drawings to which reference is now made. The knob 73 is connected to a control shaft 120 of the record/playback control 122. The control is mounted on a chassis 124 which houses the electronic equipment associated with the tape transport mechanism. The chassis is disposed under the control panel 70. A fragmentary portion of this chassis is illustrated in FIGS. 3 to 5. The control shaft 120 is mounted in a bushing 126 attached to the chassis 124. A plate 128 is secured to the bushing and non-rotatably disposed with respect to the chassis 124 by means of a stud 130. A wafer switch 132 is disposed around the shaft 120 and its non-rotative portions are fastened to the plate 128 by means of bolts 136. The rotary contacts of the wafer switch are fastened to the shaft 120 for rotation therewith.

Another plate 138 is fastened to the shaft 120 for rotation therewith. A hairpin type spring 140 is connected between the plate 138 and the plate 128. This spring biases the shaft 120 and the wafer switch 132 toward a position which is the maximum counter-clockwise position of the shaft 120, as viewed in FIG. 4, or the maximum clockwise position of the shaft 120 as viewed in FIG. 5. This position is the reproducing position of the wafer switch 132 and of the control 122. The knob 73 must therefore be turned against the bias of the spring 140 to position the switch 132 in recording position.

A bell crank lever 142 is pivotally mounted on a stud projecting upwardly from the chassis 124. One of the arms 151 of the bell crank lever 142 has a hooked end 144. A solenoid 146 is mounted by means of a U-shaped bracket 148 on the chassis 124. The armature 150 of the solenoid is connected to another arm 152 of the bell crank lever 142. A spring 154 is disposed within the solenoid 146 and biases the lever 142 in the clockwise direction about its pivotal axis 153. A U-shaped member 156 is fastened by means of a set screw 158 to the shaft 120 for rotation therewith. This U-shaped member 156 has a stepped edge (FIG. 4). The bottom surface of the U-shaped member 156 is disposed above the hooked end 144 of the lever 142. The hooked end 144 is biased into contact with the bottom surface of the member 156 by the spring 154. The hooked end is therefore biased for engagement with the stepped edge of the member 156 when the control is rotated to recording position.

The control mechanism including the bell crank lever 142 and the U-shaped member 156 is shown in latched relationship in FIGS. 3 and 4, this being the case when the control is conditioned for recording. The dashed lines in FIG. 4 show the relationship of the parts when the control is disposed in reproducing position (maximum counter-clockwise).

When the solenoid is energized, the armature 150 pulls in and pivots the lever 142 against the bias of the spring 154 out of latching engagement with the latch engaging U-shaped member 156. Accordingly, the control shaft 120 rotates in a counter-clockwise direction (as viewed in FIG. 4) back to reproducing position. This last-mentioned rotation is under the bias of the spring 140.

Figure 6:
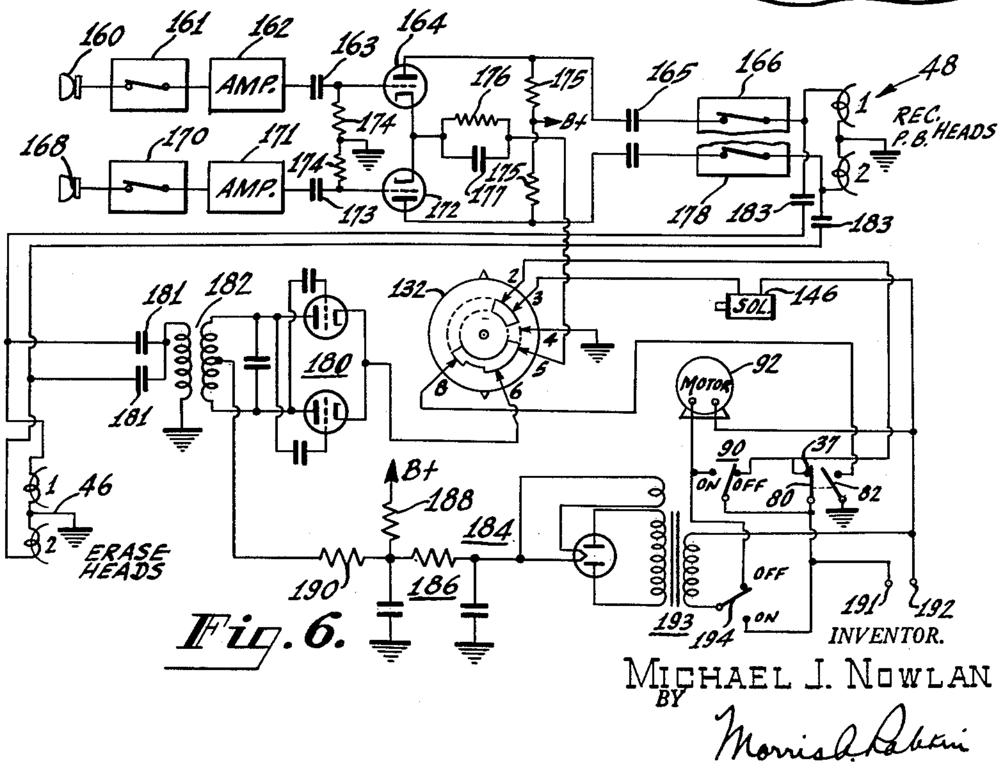
FIG. 6 is a partly diagrammatic and partly schematic view showing the electrical equipment associated with the appartus of FIG. 1.

The solenoid 146 is desirably energized by alternating current, as will be brought out in connection with FIG. 6. Accordingly, when the knob 73 is inadvertently or improperly operated to condition the apparatus for recording, the bell crank lever 142 acts as a clapper against the surface of the U-shaped member 156, causing a vibration as the alternating current applied to the solenoid provides alternating electromagnetic forces in opposition to the forces applied by the spring 154. Thus, the combination of the lever 142 and the U-shaped member 156 provides the interacting elements of a buzzer arrangement so that an audible warning may be sounded when the control 122 is inadvertently or improperly disposed in recording position.

The switching system circuit, in accordance with a preferred embodiment of the invention, is illustrated in FIG. 6 of the drawings. The apparatus is shown with the record/playback switches disposed in recording position, as would be the case when an attempt is made to condition the magnetic recording and reproducing apparatus for recording operations when a pre-recorded tape record is disposed in operating position on the deck 21.

A stereo recording system is illustrated. A right channel of the stereo system includes a microphone 160 connected through a part of a record/playback switch 161, which is illustrated schematically herein as an SPST switch, to an amplifier 162. The amplifier 162 is provided with record/playback equalization, volume controls, tone controls, and the like, in accordance with known techniques. The amplifier 162 is coupled through a capacitor 163 to an amplifier tube 164. The output of the amplifier tube 164 is coupled through a capacitor 165 and another part 166 of the record/playback switch, which is schematically illustrated as an SPST switch, to one of the core structures (indicated by the number "1") of the record/playback head 48. A left channel is similar to the right channel and includes a microphone 168, another part 170 of the record/playback switch, and another amplifier 171 similar to the amplifier 162. An amplifier tube 172 is coupled to the amplifier 171 through a capacitor 173. The other core structure (indicated by the number "2") of the record/playback head 48 is coupled to the output of the amplifier including the tube 172 through a part 178 of the record/playback switch. The amplifier including the tube 164 is similar to the amplifier including the tube 172. Each of these amplifiers has a grid return resistor 174, a plate resistor 175 connected to a source of operating voltage B+, and a common cathode bias circuit including a parallel connected resistor 176 and capacitor 177.

The circuit also includes an oscillator 180 for providing recording bias signals. This oscillator includes two cross connected vacuum tubes and a tuned output circuit. The coils of the erase head 46 are connected through different coupling capacitors 181 directly to an output transformer 182 of the oscillator 180. The oscillator is also connected through the coupling capacitors 181 and additional trimmer capacitors 183 to the different cores, "1" and "2," of the recording and playback head 48. A power supply 184 of the full wave rectifier type is provided. This power supply includes a filter network 186 of the R-C type. Operating current for the amplifiers is available at the output of the filter network through a dropping resistor 188. Power for the oscillator 180 is provided through another dropping resistor 190 which is connected to a center tap on the primary of the output transformer 182.

A source of operating potential for the apparatus is available at power line terminals 191 and 192 which may be connected to the power lines (115 volts A.C.) by means of a line cord. A power transformer 193 for the power supply 184 is connectable across the power line terminals 191 and 192 by means of a switch 194. This is the switch mentioned above which is operated by the on/off-loudness/tone control 72 shown in FIG. 1. The motor 92 is shown connectable across the power line terminals 191 and 192 by means of the motor control switch 90. The two switches 90 and 194 operate together to provide alternative stand-by or automatic shut-off of the amplifier when reeling is stopped in the tape transport mechanism. It will be remembered that the switch 90 is de-actuated and assumes the position indicated in FIG. 6 of the drawing when reeling operations are stopped. The amplifier on/off switch 194 assumes the position shown in FIG. 6, when the on/off control is in the off position. By switching the amplifier on/off switch 194 to the on position, the power supply 184 is connected directly across the line terminals 191 and 192 and operating potentials are supplied to the electronic equipment associated with the tape transport. This places the equipment in a stand-by condition. The motor switch 90 is actuated upon pressing any of the pushbuttons 40, 41, 42 to start a reeling operation. Accordingly, the motor is energized directly from the power lines. When tape reeling is stopped either automatically or by the stop button, the power line terminals 191 and 192 remain connected to the power supply transformer 173. Thus, the electronic equipment will remain in standby condition although tape reeling operations are stopped.

In order to provide automatic shut-off of the entire instrument at the end of tape reeling operations, the on/off switch is permitted to remain in off position as indicated in FIG. 6 of the drawing. When the motor control switch 90 is actuated by pressing any of the reeling control pushbuttons 40, 41, 42, power is applied to the amplifier through the contacts of the motor control switch 90 and the contacts of the amplifier on/off switch 194 when the switch 194 is in "off" position as shown in FIG. 6. Accordingly, when tape reeling is stopped, as occurs at the end playing of one track of the tape record, the current to the amplifier is automatically shut-off.

The guide bar switch 37 includes the front contacts 80 which are connected from the line terminal 191 to contact pin No. 2 of the record/playback wafer switch 132. Some of the contacts of the wafer switch 132 have been represented schematically by the switch parts 161, 166, 170 and 178. Contact No. 3 of the record/playback wafer switch is connected through the solenoid 146 to the other line terminal 192. Accordingly, alternating current will be supplied to the solenoid when the guide bar switch 37 is in the position shown in the drawings and the record/playback switch is disposed in recording position.

It was pointed out above that the front contacts 80 of the guide bar switch are normally closed and are closed when a pre-recorded type of record is operatively associated with the magnetic recording and reproducing apparatus. Accordingly, two switches, the guide bar switch 37 and a switch section in the wafer switch 132 must be closed before the solenoid 146 is energized. The solenoid 146 is therefore energized whenever an attempt is made to shift the record/playback control 122 (FIG. 3) to recording position, when a pre-recorded type record is disposed on the magnetic recording and reproducing apparatus. Since the solenoid 146 is energizable by alternating current, the solenoid 146 will cause vibration in the mechanical links coupled thereto. This vibration results in buzzing and an audible warning indication that the record switch has inadvertently or accidentally been shifted to recording position.

The cathodes of the amplifier tubes 164 and 172 are connected to the contact pin No. 5 of the wafer switch 132. The cathodes of the tubes in the oscillator 180 are connected to the terminal pin 6 of the wafer switch. One of the back contacts 82 of the guide bar switch is connected to the pin No. 8 of the wafer switch. It will be noted that the pin No. 4 of the wafer switch 132 is connected to a point of reference potential, such as ground. When the wafer switch is disposed in playback (reproducing) position, as will be normally the case because of the bias exerted by the spring 140 (FIG. 3), the cathodes of the tubes 164 and 172 and the oscillator tubes will be grounded through the wafer switch 132 pin No. 4. However, when the wafer switch is turned in the clockwise direction to the recording position, ground is available only through the back contact 82 of the guide bar switch. The back contacts of the guide bar switch are disposed in the position shown in FIG. 6, when a pre-recorded record is disposed on the tape recording and reproducing apparatus. It will be observed that the illustrated position is the normal position of the contacts of the guide bar switch. Therefore, if no record is disposed on the tape deck 21, the cathodes of the amplifier, the tubes in the amplifier and the oscillator are ungrounded and not connected to any point of reference potential. As is the case when the tubes are ungrounded, the amplifier is inoperative to amplify signals and to apply such signals to the head 48 for recording on the tape. Similarly, the oscillator is inoperative when the cathodes of the oscillator tubes are ungrounded. Therefore, signals cannot possibly be re-recorded on the tape carried in a cartridge having a cut-out, such as the cut-outs 31 and 33, since the amplifier which drives the record/playback head is inoperative. Similarly, signals cannot be erased from the tape since the oscillator is inoperative. It is desirable that the wafer switch 132 be of the non-shorting type to prevent any possible connection of the cathodes to ground through pin No. 4 when the back contacts 82 of the guide bar switch are opened. It will be noticed that, by the switching system provided by the present invention, only one pair of switch contacts is needed to disable both the recording amplifier and the erase oscillator. This is because the cathodes of these amplifiers are connected together through this single pair of contacts.

At least one additional pair of switch contacts is eliminated by the cathode switch connections provided by the present invention. For example, another switch in the power supply connection would otherwise be needed, since the oscillator and the amplifier have different operating potentials applied thereto by virtue of different dropping resistors 188, 190 that are used to supply more current to the oscillator than to the amplifier.

It will be noticed that the spring 154 in the solenoid 146 prevents holding of the armature 150 after the circuit to the solenoid is broken due to possible residual magnetization. Therefore, an additional advantage is obtained by the arrangement of the spring 154 within the solenoid. An alternative construction can be provided wherein an external spring is connected between an extension 151 on the lever 142 and the chassis 124. However, the spring internally of the solenoid is more suitable.

From the foregoing description, it will be apparent that I have provided an improved control switch system for magnetic recording and reproducing apparatus which prevents damage to tape records having pre-recorded selections thereon. It will also be apparent that many of the features of the apparatus which I have provided may also be incorporated in reeling systems for magnetic records carried on reels or otherwise to obtain the advantages of foolproof operation provided by the invention. While I have shown my control system according to one form of my invention, various components and elements useful therein, as well as variations in the mechanisms themselves, all coming within the spirit of the invention, will, no doubt, readily suggest themselves to those skilled in the art. Hence, I desire that the foregoing be considered as illustrative and not in any limiting sense.

What is claimed is:

1. In magnetic recording and reproducing apparatus cooperative with pre-recorded record units, the combination of means shiftable between recording and reproducing positions for alternatively conditioning the apparatus for recording and reproducing, means engageable with said conditioning means when said conditioning means is shifted to recording position for retaining said conditioning means in recording position, and means responsive to said record units and to the shift of said conditioning means into recording position for counteracting retention of said conditioning means by said means engageable therewith in recording position.

2. In magnetic recording and reproducing apparatus cooperative with pre-recorded record units, the combination of means shiftable between a recording position and a reproducing position for alternatively conditioning the apparatus for recording and reproducing, means biasing said conditioning means to said reproducing position, a latch element biased for engagement with said conditioning means when said conditioning means is shifted to said recording position, said latch element being operative to retain said conditioning means in said recording position, and electromagnetic means coupled to said latch element and responsive to said record units and to the shift of said conditioning means into recording position for moving said latch element against its bias to a position preventing engagement of said element with said conditioning means.

3. In magnetic recording and reproducing apparatus cooperative with a pre-recorded record unit, the combination of record erasing means, a control shiftable from a first position to a second position for conditioning said erasing means for operation to erase a magnetic record, a latch, means included on said control engageable with said latch when said control is shifted to said second position, electromagnetic means coupled to said latch for disengaging said latch from said control, and circuit means for energizing said electromagnetic means, said circuit means including a first switch coupled to said control and a second switch operated by said record unit, said first switch completing one part of said circuit means when said control is shifted to said second position, and said second switch completing another part of said circuit when said record unit is operatively associated with said apparatus.

4. In magnetic recording and reproducing apparatus cooperative with a pre-recorded record unit, the combination which comprises means movable between recording and reproducing positions for alternatively conditioning the apparatus for recording and reproducing, electrically operated means for preventing positioning of said conditioning means in said recording position, and means for energizing said electrically operated means responsive to said record unit when said unit is operatively associated with said apparatus and responsive to said conditioning means when said conditioning means is moved to said recording position.

5. In magnetic recording and reproducing apparatus cooperative with a pre-recorded record unit, the combination which comprises a control shiftable between reproducing and recording positions for alternatively conditioning the apparatus for recording and reproducing, electrically operated means coupled to said control for preventing retention of said control in said recording position, and switch means for energizing said electrical operating means including a first switch element disposed for operation by said record unit when said record unit is operatively associated with said apparatus and another switch element operated upon shifting of said control.

6. In magnetic recording and reproducing apparatus cooperative with a magnetic record, the combination which comprises a control member operative in a first position to condition the apparatus for reproducing and operative in a second position to condition the apparatus for recording, means biasing said control member to reproducing position, a latch engageable with said control member when said control member is shifted to recording position, a solenoid having an armature coupled to said latch, and an energizing circuit for said solenoid including a first switch operated by said control when said control is shifted to said recording position and another switch operated by said record.

7. In magnetic recording and reproducing apparatus, the combination which comprises a control operative in a first position to condition the apparatus for reproducing and shiftable to a second position to condition the apparatus for recording, a member engageable with said control when said control is shifted to said recording position for engaging said control and retaining said control in said second position, a solenoid for shifting said member out of position to engage said control, and circuit means for intermittently energizing said solenoid with alternating current power when said control is shifted to said second position to thereby vibrate said member for providing an audible warning indication.

8. In magnetic recording and reproducing apparatus, the combination which comprises a control member shiftable between reproducing and recording positions for alternatively conditioning the apparatus for recording and reproducing, a latch, a latch engaging member coupled to said control member, means biasing said latch for engagement with said latch engaging member when said control member is shifted to recording position, electromagnetic means for alternatively moving said latch against its bias away from said latch engaging member, and means for selectively energizing said electromagnetic means to effect vibration of said latch against said latch engaging member and thereby provide an audible warning when said control member is shifted to recording position.

9. In magnetic recording and reproducing apparatus adapted to cooperate with a pre-record record unit, the combination which comprises a control member shiftable from a first to a second position for alternatively conditioning the apparatus for reproducing and recording, a latch engaging member movable with said control member from reproducing to recording positions, a latch biased into contact with said latch engaging member for engaging said latch engaging member and retaining said control member in recording position, electromagnetic means coupled to said latch and adapted, when energized, to release said latch, switch means responsive to said record unit when said unit is operatively associated with said apparatus and operated when said control member is shifted into recording position for energizing said electromagnetic means, and means for applying alternating current through said switch means whereby to release said latch and effect vibration thereof against said latching engaging member so as to provide an audible warning indication of shifting said control member to recording position when said unit is associated with said apparatus.

10. In apparatus for receiving a magnetic recording unit for recording and reproducing thereon, a control shiftable from a first position to a second position for conditioning said apparatus for recording, means movable by said control when shifted into said second position for retaining said control in said second position, and means responsive to said magnetic record unit and to the position of said control operatively associated with said retaining means for releasing said retaining means from said control when said control is shifted into said second position.

11. Magnetic recording and reproducing apparatus adapted to cooperate with magnetic record units, said apparatus comprising a magnetic head for scanning a magnetic record to alternatively record and reproduce signals thereon, another magnetic head for scanning said record to erase signals recorded thereon, a bias frequency oscillator for providing recording bias to said first named head and for energizing said other head, an amplifier for driving said first named head with signals to be recorded on said record, said oscillator and said amplifier each including different electronic devices having connections to a source of operating potential and to a point of reference potential, and switch means in the one of said connections to said point of reference potential disposed for actuation by a magnetic record unit of a predetermined type for opening said one connection whereby to prevent application of signals to said first named head and also energization of said other head.

12. Magnetic recording and reproducing apparatus for receiving either pre-recorded magnetic record units or other magnetic record units in operative position thereon, magnetic transducers for scanning a magnetic record disposed in operative position in said apparatus, an oscillator circuit for energizing one of said transducers to erase said record, said oscillator circuit including an electron tube having anode, grid and cathode electrodes, an amplifier circuit for driving another of said transducers with signals to be recorded on said record, said amplifier circuit including an electron tube having anode, grid and cathode electrodes, switch means connected to said cathode electrode of said oscillator tube and said cathode electrode of said amplifier tube for completing the cathode circuits of said tubes, and an actuating element included in said switch means disposed for selective engagement with one or the other of either of said pre-recorded record units or said other record units when either one of said units is received in operating position in said apparatus.

13. In magnetic recording and reproducing apparatus having a motor driven mechanism for transporting a record adapted to be received in operative position on said apparatus and amplifier for amplifying signals recorded on and reproduced from said record, a system for energizing said motor and said amplifier which comprises means providing a source of operating power for said motor and said amplifier, first switch means connected in series with said source of operating power and said motor for connecting said source to said motor, second switch means connected in series with said amplifier for alternatively connecting said amplifier in series with said first named switch and directly to said source and means for automatically actuating said first switch means to disrupt the flow of power from said source therethrough when transport of said record in said apparatus stops.

14. In magnetic recording and reproducing apparatus which comprises a motor driven system for transporting a magnetic record and an amplifier for amplifying signals recorded on and reproduced from said record, both said motor and amplifier being energizable from a source of operating power, a system for energizing said motor and said amplifier comprising a control switch on said transport for energizing said motor directly from said source when said transport is conditioned for tape driving operations, another control switch for energizing said amplifier directly from said source and, alternatively, connecting said amplifier to said first named control switch for energization from said source through said first-named control switch, and means for automatically actuating said first-named control switch to disrupt the flow of power therethrough from said source when transport of said record in said apparatus stops.

References Cited in the file of this patent

UNITED STATES PATENTS

| | | |
|---|---|---|
| 2,466,514 | Vagtborg | Apr. 5, 1949 |
| 2,538,892 | Begun | Jan. 23, 1951 |
| 2,612,565 | Heller | Sept. 30, 1952 |
| 2,921,991 | Sher | Jan. 19, 1960 |
| 2,930,855 | Blakistone | Mar. 29, 1960 |